US007680634B2

(12) United States Patent
Boltyenkov et al.

(10) Patent No.: US 7,680,634 B2
(45) Date of Patent: Mar. 16, 2010

(54) ELLIPSOIDAL LINE CUT SYSTEM AND METHOD FOR HEARING AID SHELL DESIGN

(75) Inventors: Artem Boltyenkov, Lawrenceville, NJ (US); Andreas Reh, Princeton, NJ (US); Tong Fang, Morganville, NJ (US); Fred McBagonluri, Windsor, NJ (US); Jörg Bindner, Weisendorf (DE)

(73) Assignees: Siemens Hearing Instruments, Inc., Piscataway, NJ (US); Siemens Aktiengesellschaft, Munich (DE); Siemens Corporation, Iselin, NJ (US)

( * ) Notice: Subject to any disclaimer, the term of this patent is extended or adjusted under 35 U.S.C. 154(b) by 718 days.

(21) Appl. No.: 11/538,185

(22) Filed: Oct. 3, 2006

(65) Prior Publication Data

US 2008/0078082 A1 Apr. 3, 2008

(51) Int. Cl.
*G06F 17/50* (2006.01)

(52) U.S. Cl. ................. 703/1; 703/2; 700/98; 700/118; 29/896.21; 345/419; 381/322

(58) Field of Classification Search ..................... 703/1, 703/2, 6, 7; 29/896.21; 345/419; 381/322; 700/98, 118

See application file for complete search history.

(56) References Cited

U.S. PATENT DOCUMENTS

| | | | | |
|---|---|---|---|---|
| 7,050,876 | B1 * | 5/2006 | Fu et al. | 700/118 |
| 7,328,080 | B2 * | 2/2008 | Fu et al. | 700/118 |
| 2004/0107080 | A1 * | 6/2004 | Deichmann et al. | 703/6 |
| 2007/0057942 | A1 * | 3/2007 | Unal et al. | 345/419 |
| 2007/0086610 | A1 * | 4/2007 | Niederdrank | 381/312 |
| 2007/0189564 | A1 * | 8/2007 | McBagonluri et al. | 381/322 |
| 2007/0201713 | A1 * | 8/2007 | Fang et al. | 381/322 |

OTHER PUBLICATIONS

Klein, Reinhard et al., "Reconstruction and simplification of surfaces from contours," *Graph Models*, (2000) 62:429-443.

Cheng, Su-Wing et al., "Improved Constructions of Delaunay Based Contour Surfaces" *Proc. ACM Sympos Solid Modeling and Applications 99*, (1999) pp. 322-323.

Keppel, E. "Approximating complex surfaces by triangulation of contour lines," *IBM J. RES. DEV. 19* (1975) pp. 2-11.

* cited by examiner

*Primary Examiner*—Russell Frejd
(74) *Attorney, Agent, or Firm*—Francis G Montgomery

(57) ABSTRACT

A system and appertaining algorithm provide a cutting and shaping of the hearing aid shell using an Ellipsoidal Line Cut that increases the speed of detailing operations and enables a creation of more cosmetically appealing shells. A contour algorithm determines a projected contour on the bottom cut plane that corresponds in shape to a portion of the line cut plane contour, and a merger algorithm defines a line cut surface between the portion of the line cut plane contour and the projected contour. An elimination algorithm eliminates parts of the new hearing aid shell design that extend beyond boundaries defined by the original hearing aid shell design.

12 Claims, 6 Drawing Sheets

ELLIPSOIDAL LINE CUT SYSTEM AND METHOD FOR HEARING AID SHELL DESIGN

BACKGROUND

The present invention is directed to a system and method for cutting hearing aid shells using an ellipsoidal line cut methodology.

Hearing aid shells that house various hearing aid components are designed to fit into the ear of a wearer. However, each user's ear is shaped differently so that a one-size-fits all approach cannot be used or would result in a poor fit and cause discomfort for the wearer. For this reason, customized shells are created that correspond to the particular shape of the user's ear.

In order to create such a customized shell, an impression of the user's ear is taken using a soft moldable material that conforms to the shape of the user's ear which subsequently hardens. This impression can then be used to create a hearing aid shell design that precisely matches the user's ear, resulting in a good fit and comfort for the wearer.

Traditionally, this process would involve a manual creation, cutting, and trimming of the shell, based on the impression. However, advances in the field have permitted the use of computer software to assist in the creation of shell designs. This software works from a digitized model of the impression and can create a digitized model of the shell from this impression that can be operated on with the use of a computer program and/or can assist in automated procedures for modifying the shelf.

FIG. 1A illustrates a typical digitized model of a hearing aid shell 10 to which a bottom cut plane 50 (FIG. 2) has been applied, creating a bottom cut contour 52.

FIG. 2 illustrates known application of the Bottom Cut Plane 50 to the hearing aid shell 10. A hearing aid shell 10 has a Bottom Cut Plane 50, which defines the border of the bottom opening of the shell 10. After a scanning/triangulation of the shell 10, which creates a 3D digital definition of a shell shape, the shell 10 typically has a non-planar contour which defines the Bottom of the Shell. In order to make the contour planar, the Bottom Cut Plane 50 is introduced which defines a new topology of the shell opening contour (Bottom Cut Plane Contour) 52, which is defined as the intersection between the shell 10 and the Bottom Cut Plane 50. The remove portion 14, i.e., the material below the plane 50, is removed and all holes between the plane 50 and the keep portion 12 of the remaining shell are filled with material.

One of the basic detailing and modeling procedures is to utilize what is know as a line cut plane that is used to define a cut plane for detailing operations, separating the shell 10 along a planar boundary into a keep portion 12 and a remove portion 14, producing a Line Cut Plane contour 62. The face that is created by the cut plane must be filled in order to create a coherent shell. Theoretically, filling could be performed by simply applying the plane as an actual part of the shell. In the real world, this would create sharp edges and unpleasant aesthetics that are not practical. Therefore, various techniques have been applied to adapt the surface 64 created by the line cut plane into a more practical shape.

FIG. 1C illustrates the application of a rounding process where the cutting area defined by the cut plane has been filled and rounded according to certain defined parameters. A modification of this technique can be to provide the rounding function that includes an offset plane which provides boundaries to the rounding operation (see FIG. 1E).

FIG. 1D illustrates the application of an alternate tapering process, which serves to remove a tip area of the shell with a smoothing bounding area, such that after the cut plane is applied and filled, a smoothing operation is performed. Prahl Tapering is a refinement of the tapering that utilizes an offset plane to further define a rounding effect. Similarly, Helix Tapering is used to reshape the helix material of the shell with a rounding effect, according to various parameters. A "Prahl Taper" refers to a polynomial shrink of the canal of the shell impression usually initiated from the aperture to the canal tip. It is characterized by an erosion parameter, which is the measure of the required shrink and a maximum reduction parameter, which determines the required reduction in canal length. A "Helix Taper" refers to a polynomial shrink of the helix which begins at the highest point on the helix to a user defined position of the helix.

These shaping procedures generally replicate the manual procedures that have been used to craft the shells in the past to change the shape of a part of the shell where the button/bottom cut plane is involved. In essence, they replicate cutting with a knife and then performing some rounding around the cut. The most classic use examples are for, e.g., decreasing the full impression to fit the size of a half-shell or mini-canal design, or, for example, cutting off the intertragal notch. In these examples, some material is removed from the shell and the nature of removing the material requires that bottom cut contour is changed, or actually shrunken. These current approaches of rounding and tapering create a relatively aesthetically unpleasant resultant shell.

SUMMARY

A system and appertaining algorithm for providing an improved cutting and shaping of the hearing aid shell using an Ellipsoidal Line Cut is provided that increases the speed of detailing operations and enables a creation of more cosmetically appealing shells. After applying the Ellipsoidal Line Cut, the shell looks more cosmetically appealing than conventional cuts since the visibility of such a cut is minimized or eliminated; the application of the Ellipsoidal Line Cut reduces the shell size. The use of the ellipsoidal cut is substantially advanced over the previous shaping techniques that had been used.

Thus a method is provided for trimming a hearing aid shell, comprising: producing a 3D data definition of an original hearing aid shell design; establishing a line cut plane that is not parallel to a bottom cut plane, thereby defining a line cut plane contour by an intersection of the line cut plane and the hearing aid shell; creating a projected contour on the bottom cut plane that corresponds in shape to a portion of the line cut plane contour; defining a line cut surface between the portion of the line cut plane contour and the projected contour; identifying a first portion of the hearing aid shell on one side of the line cut surface as a keep portion of the hearing aid shell, and second portion of the hearing aid shell on the other side of the line cut surface as a removal portion of the hearing aid shell, a new hearing aid shell design being defined by the keep portion of the hearing aid shell; eliminating parts of the new hearing aid shell design that extend beyond boundaries defined by the original hearing aid shell design; and producing a hearing aid shell corresponding to the new hearing aid shell design.

A system is also provided for trimming a hearing aid shell, comprising: a computer system having a processor, user input device, user display device, data storage device, and communications device; a line cut algorithm for establishing a line cut plane in a 3D model of an original hearing aid shell design that is not parallel to a bottom cut plane of the hearing aid shell; a contour algorithm for determining a projected contour on the bottom cut plane that corresponds in shape to a portion of the line cut plane contour; a merger algorithm for defining a line cut surface between the portion of the line cut plane contour and the projected contour, identifying a first portion of the hearing aid shell on one side of the line cut surface as a keep portion of the hearing aid shell, and second portion of the hearing aid shell on the other side of the line cut surface as a removal portion of the hearing aid shell, a new hearing aid shell design being defined by the keep portion of the hearing aid shelf; and an elimination algorithm for eliminating parts of the new hearing aid shell design that extend beyond boundaries defined by the original hearing aid shell design.

A hearing aid shell is provided comprising: a line cut surface comprising a border contour divided into a first contour portion and a second contour portion, the first and second contour portions completely defining the border contour, wherein: the first contour portion has a first shape; and the second contour portion has a second shape lying in a bottom cut surface that is not parallel to the line cut surface, the second shape being identical to the first shape except that is flattened by a shrinking ratio. Finally, the algorithms for execution on a processor can be stored on a computer readable media.

With this process, the size of the shell in the areas where bottom cut contour is present is decreased by a sophisticated shrinking of the shell approach as opposed to the more primative knife cut and round approach. In this way, the unneeded parts of the shell are cut without making where the cut was done obvious to viewers of the shell. With the use of rounding, tapering and rounding with offset techniques, it is quite apparent that the impression was cut. In the case of ellipsoidal line cut, instead of the clearly visible cut, an approximation of the shape of the surface is done considering the shape of the remaining part of the shell in such a way that it looks more like the shell has shrunken, as opposed to being cut and rounded.

The advantage of having shell looking like as if it has shrunken, instead of cut, is that in after performing the ellipsoidal line cut, the operator of the detailing software does not have to worry about how the shell looks like after his cut and whether it is "edgy" (i.e., contains unattractive rounded edges) or not. With the ellipsoidal line cut approach, the operator can concentrate on making a shell of the correct size with the appropriate cuts and does not have to worry about whether the shell looks edgy or not (since a hearing aid that looks like a box with rounded edges is less aesthetically pleasing, and hence, less marketable, than one that has been created using the ellipsoidal line cut.

The algorithm accepts the following inputs: a mathematical 3D definition of a hearing aid shell; a mathematical definition of a Bottom Cut Plane and a Line Cut Plane; and, a Shrinking Ratio. The result of applying the algorithm to the shell is a shell with a modified shape at the place where Ellipsoidal LineCut was applied. The rest of the shell remains untouched. The algorithm can function both on hollowed and unhollowed shells; it is used to cut the parts of the shell where the Ellipsoidal Line Cut Pivot Axis intersects with the shell.

The present system and method are designed to provide a mechanism for simplifying the design of a hearing aid shell, potentially serving to replace the use of Helix Tapering, Prahl Tapering, Rounding, Tapering, and Rounding with Offset in this context.

The algorithm can be operated on a standard computer system having a central processing unit, user input and output devices, data storage, and mechanisms for remote communications. With current technology, the algorithm can operate in under five seconds and can be designed to run independent of any particular platform.

DESCRIPTION OF THE DRAWINGS

The invention is described according to various embodiments illustrated in the Figures and referenced by the following description.

DETAILED DESCRIPTION OF THE PREFERRED EMBODIMENTS

Figure 1A:
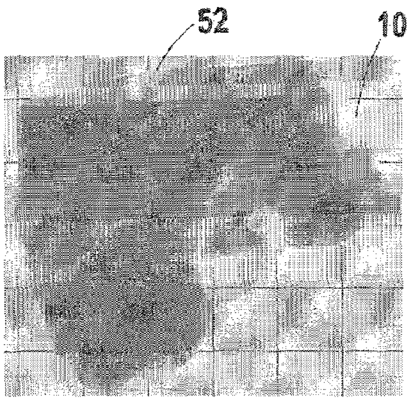
FIG. 1A is a pictorial representation of a shell model.
Figure 1B:
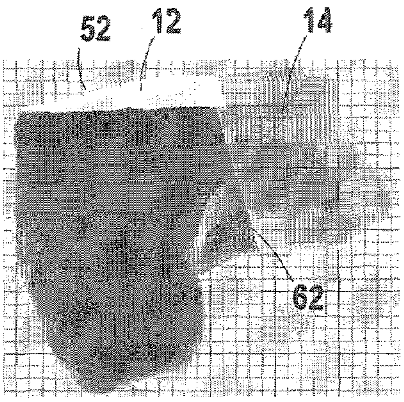
FIG. 1B is a pictorial representation of a shell model having a Line Cut Plane defined.
Figure 1C:
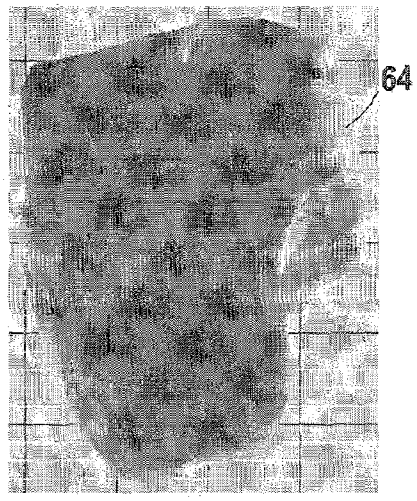
FIG. 1C (PRIOR ART)
FIG. 1C is a pictorial representation of a shell model to which a known rounding technique has been utilized after the Line Cut Plane cutting and filling.
Figure 1D:
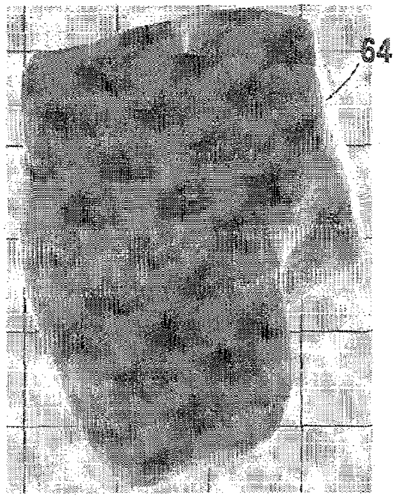
FIG. 1D (PRIOR ART)
FIG. 1D is a pictorial representation of a shell model to which a known tapering technique has been utilized after the Line Cut Plane cutting and filling.
Figure 1E:
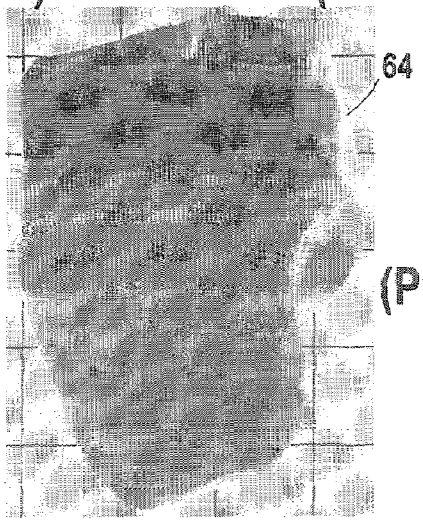
FIG. 1E (PRIOR ART)
FIG. 1E is a pictorial representation of a shell model to which a known rounding with offset technique has been utilized after the Line Cut Plane cutting and filling.
Figure 2:
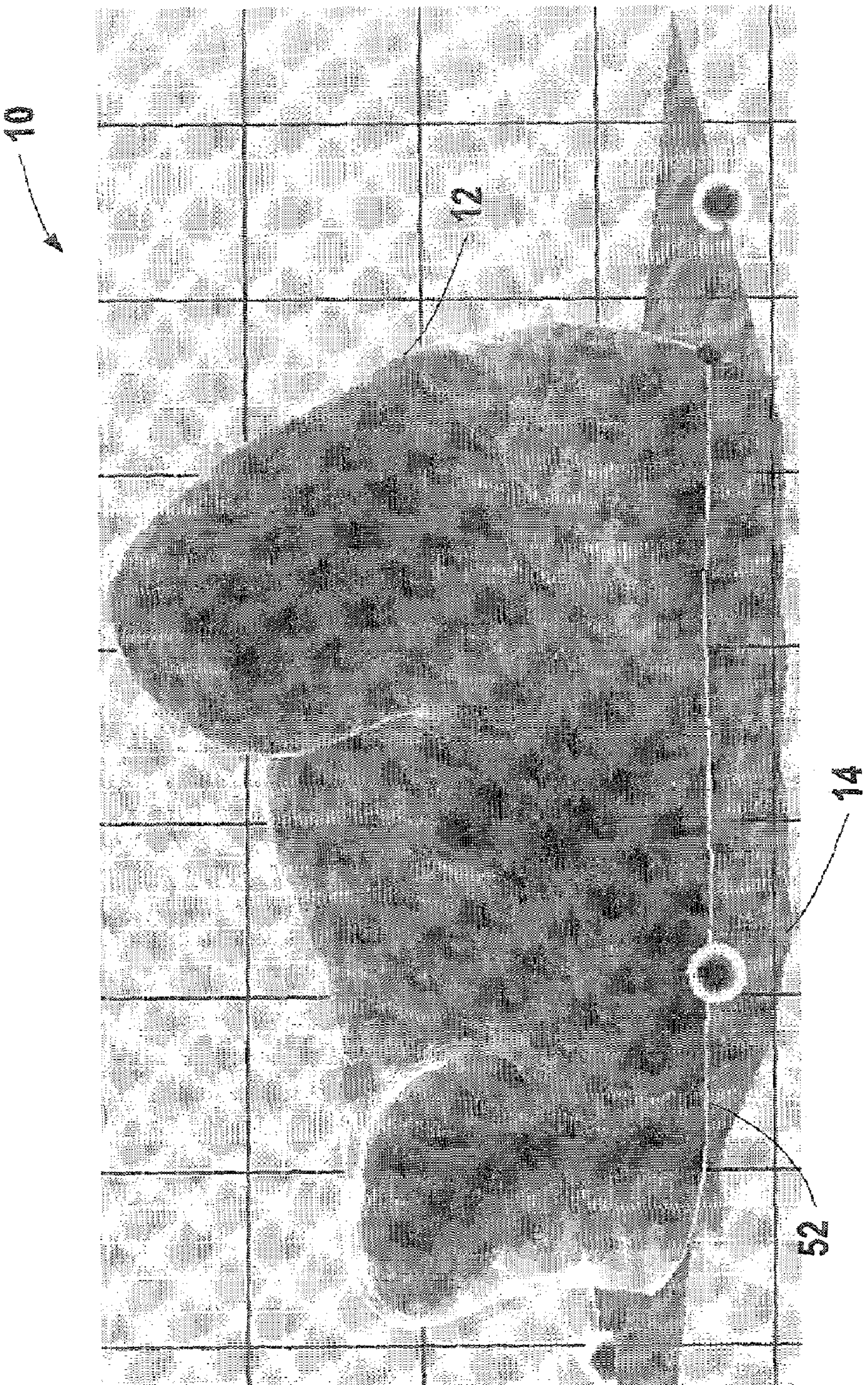
FIG. 2 (PRIOR ART)
FIG. 2 is a pictorial representation of a shell model illustrating the known use of the Bottom Cut Plane.
Figure 3A:
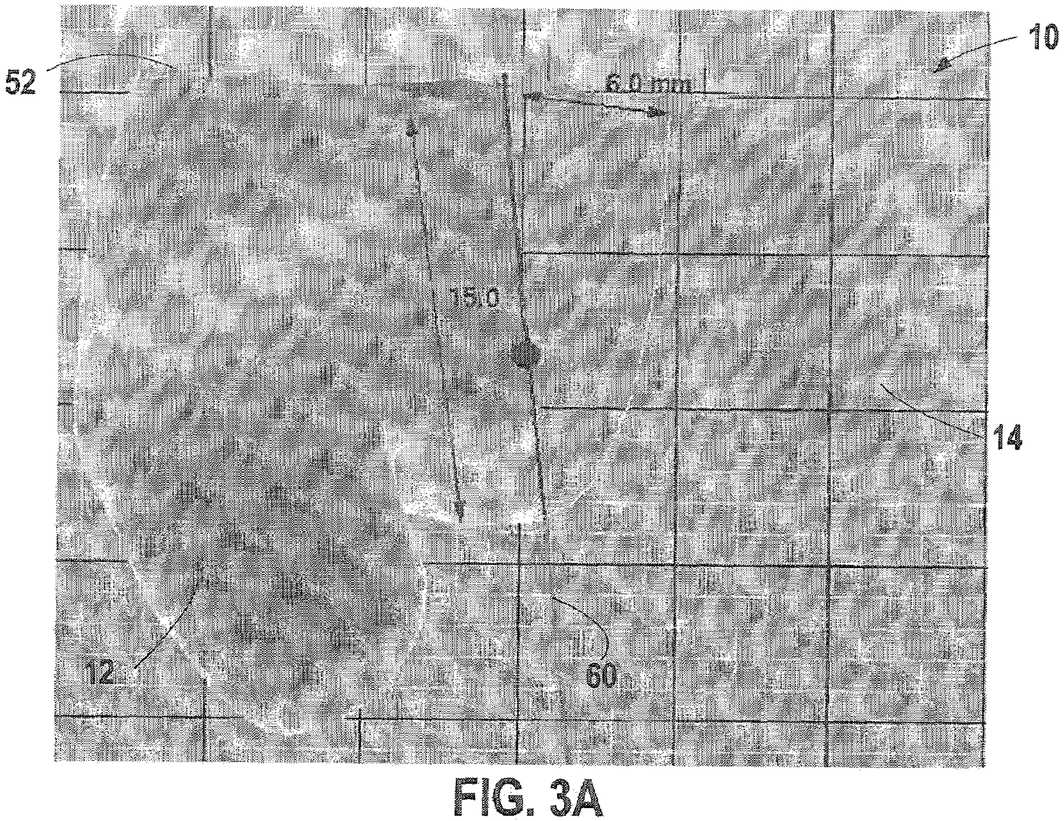
FIG. 3A is a pictorial representation illustrating a Measurement based Ellipsoid Line Cut.
Figure 3B:
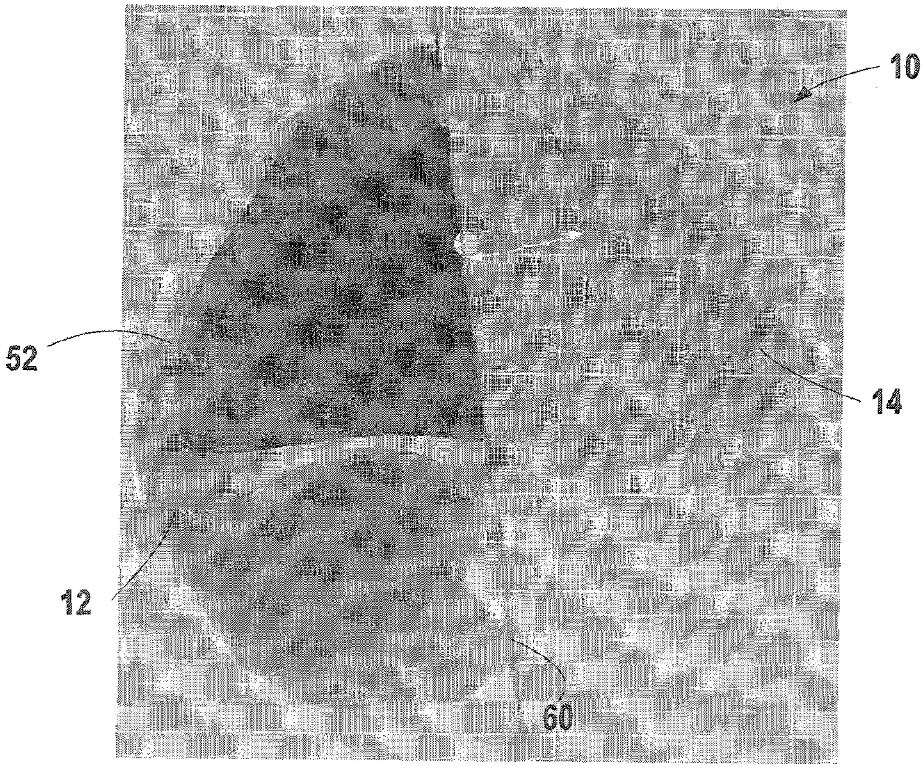
FIG. 3B is a pictorial top view of the Ellipsoidal Line Cut.

FIG. 3A illustrates the measurement-based nature of the Ellipsoidal Line Cut. The shell design in general is based on required measurements for a particular shell for a user. For instance, detailing operators know that in order to create a half shell design, they need to ensure, e.g., that the distance from intertragal notch in the direction of helix is limited to 14 mm or some other defined value. Such a limit could be required, for instance, by the fact that the standard electronics module used for such a shell type requires a particular amount of space to fit in. Or, for instance, industry standards will not allow considering a shell bigger then 14 mm in one of the directions as a half shell, but instead would consider this as a full-shell (which is cheaper in the marketplace). In FIGS. 3A and 3B, the Line Cut Plane 60 of the shell is illustrated with the respective keep portion 12 and remove portion 14 of the hearing aid shell 10. FIG. 3B is a top view of what is shown in FIG. 3A.

Figures 4A, 4B, 4C, 4D, 4E:
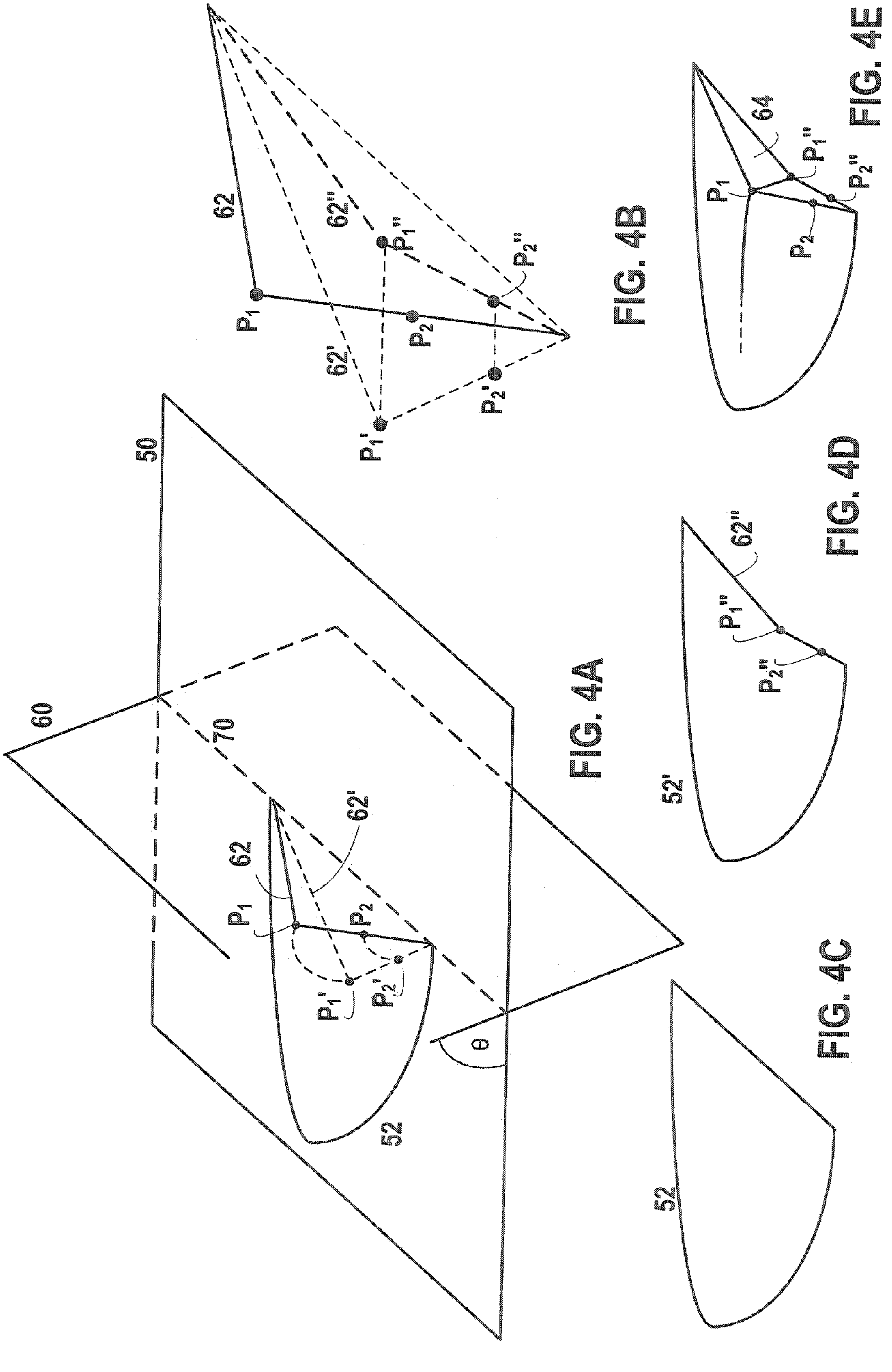
FIG. 4A is a pictorial isometric illustration showing the Bottom Cut Plane, the Line Cut Plane, and resultant shell contours defined by the intersection of the shell with these planes.
FIG. 4B is a geometric illustration of the Line Cut Contour, its projection on the Bottom Cut Plane, and the shrunken projection.
FIG. 4C is a pictorial illustration of the original Bottom Cut Plane Contour.
FIG. 4D is a pictorial illustration of the modified Bottom Cut Plane Contour.
FIG. 4E is a pictorial illustration of the modified shell design using the modified Bottom Cut Plane Contour.
Figure 5:
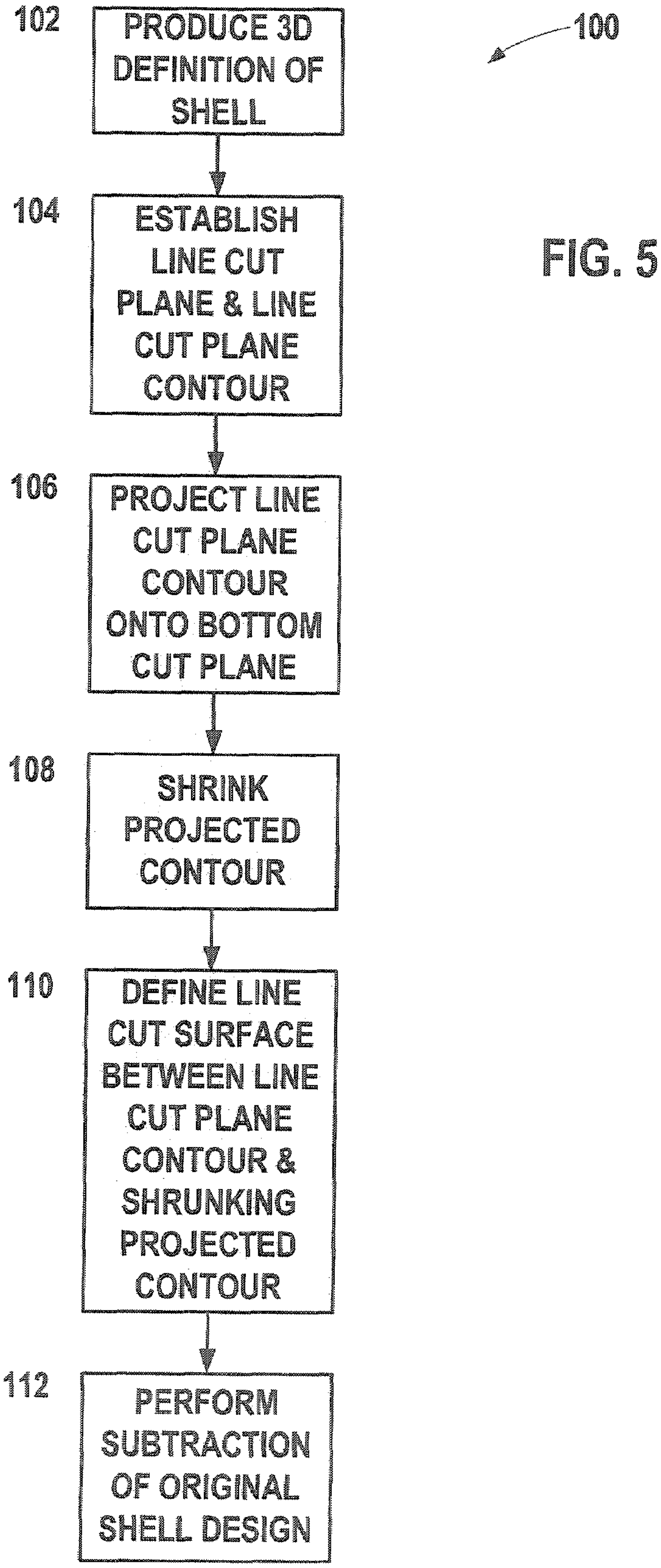
FIG. 5 is a flowchart illustrating the steps of the inventive method.

FIGS. 4A and 4B illustrate the respective geometries regarding the various planes and contours. FIG. 5 provides the basic method steps for the operation. A hypothetical shell shape, which would never be found in practice, is used for ease of illustration. According to the process 100, a digital 3D definition of the shell 10 is produced. The hypothetical shell shape comprises a semi-elliptical cross sectional contour shape 52 in its intersection with the Bottom Cut Plane 50, and comprises a generally triangular cross sectional contour shape 62 in its intersection with a Line Cut Plane 60. After the digital definition of the shell is established and the appertaining Bottom Cut Plane 50 has been applied, a line cut plane is established by the operator 104. The Line Cut Plane 60 intersects the shell 10, and indicates, via a vector normal to this plane, which part of the shell 10 is preserved and which part is removed. Only the respective Bottom Cut Plane Contour 52 and Line Cut Plane Contour 62 of the shell are shown for the sake of clarity.

According to a contour transformation algorithm, the Line Cut Plane Contour 62 is divided into a moving part and a fixed part. All points of the Shell Line Cut Plane Contour 62 lying on the Bottom Cut Plane 50, i.e. along an ellipsoidal Line Cut Pivot Axis 70 (defined as the intersection of the Bottom Cut Plane 50 and the line cut plane 60), belong to the fixed part which implies that no transformation needs to be applied to them. All other points of the Shell Line Cut Plane Contour 62 belong to the moving part and the following operations are applied to them.

First, as illustrated in FIG. 4A, all points (exemplified by $P_1$, $P_2$) of the Shell Line Cut Plane Contour 62 are projected onto the Bottom Cut Plane 50 to form a Projected Shell Line Cut Plane Contour 62' (see $P_1'$, $P_2'$) 106. This projection is done by rotating every point $P_1$, $P_2$ of the moving part of the Shell Line Cut Plane Contour 62 around the Ellipsoidal Line Cut Pivot Axis 70 on an angle θ which is equal to the angle between the Bottom Cut Plane 50 and the Line Cut Plane 60. This preserves the topology of the moving part of the Shell Line Cut Plane Contour 62 when it is projected to the Bottom Cut Plane 50.

Referring to FIG. 4B, after the projection 106 is performed, a shrinking operation 108 is applied on the moving part of the Projected Shell Line Cut Plane Contour 62', which serves to compress or flatten this contour 62'. In order to perform the shrinking operation 108, two input values are required: a Shrinking Ratio and a Shrinking Direction.

The Shrinking Ratio, which could theoretically be any value between 0 and 1, can be provided manually and directly as an input by the operator, or it can be calculated based on other supplied criteria. In normal operation, this ratio could be based on a desired size of the shell in one of its dimensions as entered by the operator, or it could be determined based on a heuristically-based algorithm that utilizes feature recognition technology.

The Shrinking direction is always directed towards the Ellipsoidal Line Cut Pivot Axis 70. During the shrinking operation, every point $P_1'$, $P_2'$ of the moving part of the Projected Shell Line Cut Plane Contour 62' is moved in the Shrinking Direction and located to a point $P_1''$, $P_2''$ which is determined by multiplying the Shrinking Ratio by the distance between the current point $P_1'$, $P_2'$ position and the Ellipsoidal Line Cut Pivot Axis 70, thereby resulting in a Shrunken Projected Shell Line Cut Plane Contour 62'', Referring to FIGS. 4C and 4D, FIG. 4C illustrates the original Bottom Cut Plan Contour 52, and FIG. 4D illustrates the New Bottom Cut Plane Contour 52', which includes the new contour boundary established by the Shrunken Projected Shell Line Cut Plane Contour 62''.

A merge algorithm 110 is subsequently applied, which defines a new Line Cut Surface 64 (FIG. 4E) that generally corresponds with the shell surface intersected by the Line Cut Plane 60, but that is adapted to include the New Bottom Cut Plane Contour 52'. In other words, the Line Cut Plane 60 intersection with the shell is changed into the newly defined surface boundary 64. This surface 64 thus serves as a new cutting boundary.

Figure 4F:
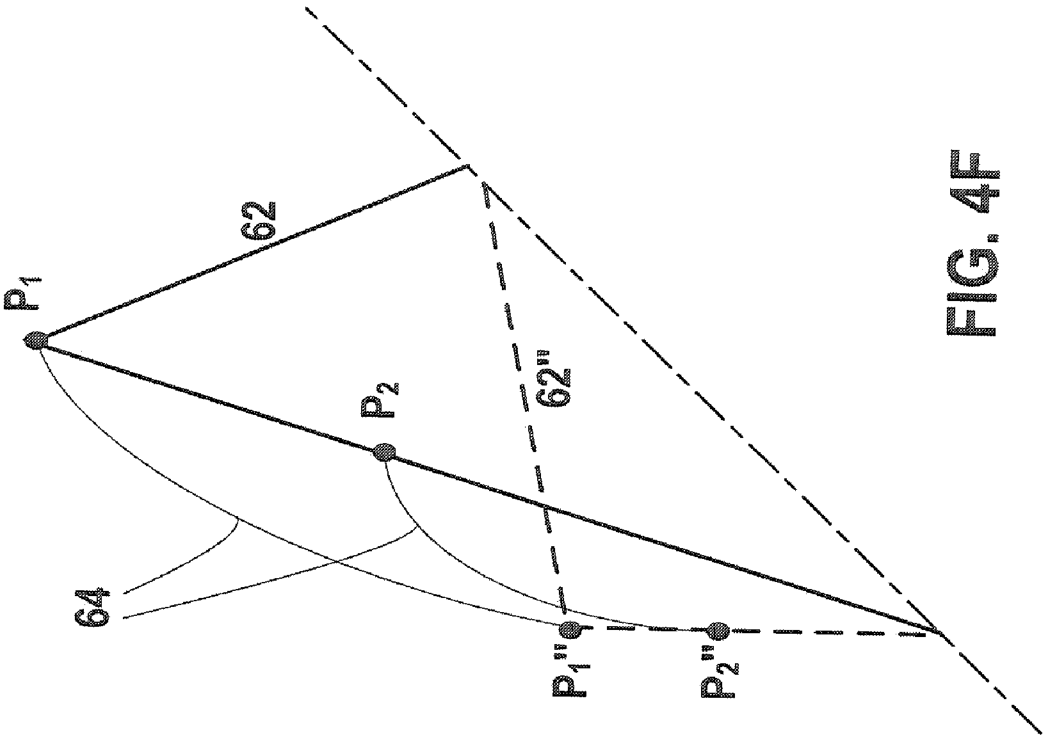
FIG. 4F is a pictorial illustration of the creation of new surface lines along a flattened elliptical angel of rotation.

The merge algorithm 110 can utilize a procedure that accepts two 2D contours 62, 62'' as an input and generates a continuous 3D surface 64 connecting the two 2D contours based on the notion that each point ($P_1$, $P_2$) in the first 2D contour 62 has a corresponding point ($P_1''$, $P_2''$) on the second 2D contour 62''. This may be accomplished by defining, e.g., a Bezier curve between each corresponding point (($P_1$, $P_1''$), ($P_2$, $P_2''$)) of the contours FIG. 4F illustrates one possible procedure in which the surface 64 is generated according to the lines of rotation through the angle θ, but is flattened into ellipses according to the Shrinking Ratio applied.

Various other known mapping techniques may also be utilized for creating the 3D surface from the 2D contours, such as those disclosed in the following references which are provided as background information, all herein incorporated by reference: 1) R. Klein, A. Schilling, W. Straer, *Reconstruction and simplification of surfaces from contours*; Graph. Models 62 (6) (2000) 429-443; 2) Siu-Wing Cheng, Tamal K. Dey, *Improved Constructions of Delaunay Based Contour Surfaces* (1999), Proc. ACM Sympos. Solid Modeling and Applications 99 1999, 322-323; and 3) E. Keppel, *Approximating complex surfaces by triangulation of contour lines*, IBM J. Res. Dev. 19 (1975) 2-11

Boolean subtraction is subsequently used 112 to change the original shell shape into a shape that is bounded by the Bottom Cut Plane 50, the new surface boundary 64, and at the same time does not exceed the limits of original impression 52. This is performed by subtracting the previously undetailed shell shape from the newly defined shell shape in order to ensure that no part of the newly generated (by the merge algorithm) surface protrudes outside of the original undetailed impression. This operation ensures that the newly modified shell design will fit into the original ear impression and not cause a fitting problem when the hearing aid is delivered to the end user.

A test may be provided prior to execution of the algorithm to determine if the input parameters are reasonable. If input parameters are not reasonable for execution of the algorithm, a specific error code containing detailed information about the problem can be returned. Furthermore, various error codes can be determined and provided to a user on the user interface device. These error codes can include, but are not limited to: 1) the Bottom Cut Plane does not intersect the shell; 2) the Line Cut Plane does not intersect the shell; 3) the shell is hollowed; 4) the shell is corrupted; 5) the Shrinking Ratio is outside of a predefined valid range; 6) the Ellipsoidal Line Cut Pivot Axis does not intersect the shell; 7) the boolean subtraction failed; 8) the merge failed; and 9) the Ellipsoidal Line Cut Contour Transformation and Shrinking failed.

Once a final shell configuration has been established, an actual hearing aid shell may be produced in accordance with this established configuration.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

TABLE OF REFERENCE CHARACTERS

| | |
|---|---|
| 10 | hearing aid shell |
| 12 | keep portion of hearing aid shell |
| 14 | remove portion of hearing aid shell |
| 50 | bottom cut plane |
| 52 | bottom cut plane contour (shell opening contour) |
| 52' | new bottom cut plane contour |
| 60 | line cut plane |
| 62 | line cut plane contour |
| 62' | projected shell line cut plane contour |
| 62" | shrunken projected shell line cut plane contour |
| 64 | line cut surface |
| 70 | ellipsoidal line cut pivot axis |
| 100 | process |
| 102-112 | process steps |

What is claimed is:

1. A method for trimming a hearing aid shell, comprising:
producing a 3D data definition of an original hearing aid shell design;
establishing a line cut plane that is not parallel to a bottom cut plane, thereby defining a line cut plane contour by an intersection of the line cut plane and the hearing aid shell;
creating a projected contour on the bottom cut plane that corresponds in shape to a portion of the line cut plane contour;
defining a line cut surface between the portion of the line cut plane contour and the projected contour;
identifying a first portion of the hearing aid shell on one side of the line cut surface as a keep portion of the hearing aid shell, and second portion of the hearing aid shell on the other side of the line cut surface as a removal portion of the hearing aid shell, a new hearing aid shell design being defined by the keep portion of the hearing aid shell;
eliminating parts of the new hearing aid shell design that extend beyond boundaries defined by the original hearing aid shell design; and
producing a hearing aid shell corresponding to the new hearing aid shell design.

2. The method according to claim 1, further comprising:
defining an ellipsoidal line cut pivot axis by an intersection of the bottom cut plane and the line cut plane, the line cut plane lying at an angle from the bottom cut plane;
wherein the creating of the projected contour comprises:
projecting points defining the portion of the line cut plane contour onto the bottom cut plane by rotation through the angle about the ellipsoidal line cut pivot axis; and
moving the projected points towards the ellipsoidal line cut pivot axis by an amount related to each respective projected points' distance from the ellipsoidal line cut pivot axis multiplied by a shrinking ratio, the moved points thereby defining a shrunken contour.

3. The method according to claim 2, wherein the shrinking ratio is a user-supplied value.

4. The method according to claim 2, wherein the shrinking ratio is calculated from shell size parameters.

5. The method according to claim 2, wherein the shrinking ratio is calculated utilizing feature recognition technology.

6. The method according to claim 1, wherein:
the elimination of parts of the new hearing aid shell design that extend beyond boundaries defined by the original hearing aid shell design comprises performing a Boolean subtraction between the original hearing aid shell design and the new hearing aid shell design to remove portions of the new hearing aid shell design that protrude outside of boundaries of the original hearing aid shell design.

7. The method according to claim 1, wherein the defining of the line cut surface comprises:
establishing corresponding sets of points between the portion of the line cut plane contour and the projected contour; and
calculating lines or curves between corresponding points in the sets of points.

8. The method according to claim 7, wherein the lines or curves between corresponding points are Bezier curves.

9. The method according to claim 7, wherein the lines or curves between corresponding points are elliptical arc segments through an angle between the line cut plane and the bottom cut plane.

10. A system for trimming a hearing aid shell, comprising:
a computer system having a processor, user input device, user display device, data storage device, and communications device;
a line cut algorithm for establishing a line cut plane in a 3D model of an original hearing aid shell design that is not parallel to a bottom cut plane of the hearing aid shell;
a contour algorithm for determining a projected contour on the bottom cut plane that corresponds in shape to a portion of the line cut plane contour;
a merger algorithm for defining a line cut surface between the portion of the line cut plane contour and the projected contour, identifying a first portion of the hearing aid shell on one side of the line cut surface as a keep portion of the hearing aid shell, and second portion of the hearing aid shell on the other side of the line cut surface as a removal portion of the hearing aid shell, a new hearing aid shell design being defined by the keep portion of the hearing aid shell; and an elimination algorithm for eliminating parts of the new hearing aid shell design that extend beyond boundaries defined by the original hearing aid shell design.

11. A hearing aid shell, comprising:

a shell surface and one portion of the surface being a line cut surface comprising a border contour divided into a first contour portion and a second contour portion, the first and second contour portions completely defining the border contour, wherein:

the first contour portion has a first bent shape derived from an intersection of the shell and a line cut plane; and the second contour portion has a second bent shape lying in a bottom cut surface that is not parallel to the line cut surface and which is derived from an intersection of the shell and a bottom cut plane, the second bent shape being derived from a projection of the first contour portion onto the bottom cut plane which is flattened out to make it less bent so that the second bent shape is less bent than the first bent shape.

12. A computer readable media which designs a hearing aid shell, said media having a computer program which performs the steps of:

producing a 3D data definition of an original hearing aid shell design;

establishing a line cut plane that is not parallel to a bottom cut plane, thereby defining a line cut plane contour by an intersection of the line cut plane and the hearing aid shell;

creating a projected contour on the bottom cut plane that corresponds in shape to a portion of the line cut plane contour;

defining a line cut surface between the portion of the line cut plane contour and the projected contour;

identifying a first portion of the hearing aid shell on one side of the line cut surface as a keep portion of the hearing aid shell, and second portion of the hearing aid shell on the other side of the line cut surface as a removal portion of the hearing aid shell, a new hearing aid shell design being defined by the keep portion of the hearing aid shell;

eliminating parts of the new hearing aid shell design that extend beyond boundaries defined by the original hearing aid shell design; and producing the hearing aid shell design which is used to manufacture to the hearing aid shell.

* * * * *